United States Patent
Carberry et al.

(10) Patent No.: US 6,497,095 B2
(45) Date of Patent: Dec. 24, 2002

(54) REGENERATION OF DIESEL ENGINE PARTICULATE FILTER ONLY ABOVE LOW FUEL LEVELS

(75) Inventors: Brendan Patrick Carberry, Aachen (GB); David Arthur Ketcher, Chelmsford (GB); Paul Eduard Moraal, Vaals (NL)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/745,359

(22) Filed: Dec. 21, 2000

(65) Prior Publication Data

US 2002/0078684 A1 Jun. 27, 2002

(51) Int. Cl.$^7$ ................................................ F01N 3/00
(52) U.S. Cl. ........................... 60/295; 60/274; 60/284; 60/286; 60/287; 60/311
(58) Field of Search .................... 60/284, 287, 295, 60/311, 297, 285, 274, 286

(56) References Cited

U.S. PATENT DOCUMENTS

| | | | | |
|---|---|---|---|---|
| 4,596,277 A | * | 6/1986 | Djordjevic | 141/104 |
| 5,050,376 A | * | 9/1991 | Stiglic et al. | 60/274 |
| 5,211,010 A | * | 5/1993 | Hirota | 60/280 |
| 5,313,925 A | * | 5/1994 | Otsuka et al. | 123/520 |
| 5,319,930 A | * | 6/1994 | Shinzawa et al. | 60/286 |
| 5,544,639 A | * | 8/1996 | Shouda et al. | 123/676 |
| 5,771,686 A | * | 6/1998 | Pischinger et al. | 60/274 |
| 5,974,791 A | * | 11/1999 | Hirota et al. | 60/286 |
| 6,032,461 A | * | 3/2000 | Kinugasa et al. | 60/295 |
| 6,276,310 B1 | * | 8/2001 | Backes et al. | 123/1 A |
| 6,304,815 B1 | * | 10/2001 | Moraal et al. | 60/295 |

FOREIGN PATENT DOCUMENTS

| | | | |
|---|---|---|---|
| JP | 5106518 | * | 4/1993 |
| JP | 7189653 | * | 7/1995 |

* cited by examiner

Primary Examiner—Thomas Denion
Assistant Examiner—Diem Tran
(74) Attorney, Agent, or Firm—Carlos L. Hanze

(57) ABSTRACT

A filter used to remove particulates from a diesel engine exhaust is regenerated by increasing the exhaust temperature to achieve burn off of the accumulated particulates. Regeneration of the filter is inhibited when the sensed level of fuel in a diesel fuel tank for the engine falls below a first threshold level. Optionally, filter regeneration may be initiated when the sensed fuel level is between the first threshold and a higher threshold, and the load level of particulates accumulated in said filter is above a preselected, relatively high load level. Increase of the exhaust temperature to achieve burn off may be achieved by a variety of techniques, including throttling the intake of said engine, reducing the oxygen content in the exhaust gases delivered to said engine, closing an EGR valve of said engine, or performing post injection of fuel in the engine's combustion cylinders.

19 Claims, 3 Drawing Sheets

REGENERATION OF DIESEL ENGINE PARTICULATE FILTER ONLY ABOVE LOW FUEL LEVELS

TECHNICAL FIELD

The present invention generally relates to filters for removing particulates from the exhaust gas of diesel engines, and deals more particularly with a method of regenerating the filter only when the level in the engine's fuel tank is above a preselected value.

BACKGROUND OF THE INVENTION

Emission after-treatment devices are used to collect particulate matter from the exhaust gas of internal combustion engines. In particular, conventional emission treatment devices for diesel engines include particulate filters, oxidation catalysts and nitrous oxide (NOx) catalysts. A problem exists with particulate filters in that the particulates, which consist largely of carbon particles, tend to plug the filters, resulting in a restriction to the flow of exhaust gas. In order to periodically regenerate or purge the filter from particulates, it is known to take measures which result in an increase of the exhaust gas temperature above a predetermined level (e.g. above (450° C.) in order to incinerate the carbon particles accumulated in the filter.

One conventional method used to increase the exhaust gas temperature involves controlling a throttle valve in the intake manifold of the engine. In particular, it is known that by throttling/closing the throttle valve, the exhaust gas temperature may be increased. Numerous methods have been used for controlling the throttle valve. For example, in one conventional method, the intake throttle valve is controlled by utilizing the difference between a calculated target intake manifold pressure, and an actual intake manifold pressure. The target intake manifold pressure is calculated using an engine speed and engine load. The regeneration process is scheduled by engine control software based on an estimate of the particulate loading. Known techniques for raising the exhaust gas temperature result in an increase in the fuel consumption during the regeneration process. Driver dissatisfaction can result, however, if the regeneration event is initiated at a time when the vehicle's fuel tank is near empty, as when the low fuel warning lamp is illuminated. For example, the driver may observe an unexpected rapid reduction in the vehicle's remaining driving range at a critical time, or the driver may observe what appears to be poor fuel economy due to the driver's closer scrutiny of fuel mileage when the fuel tank is near empty. In an extreme case, the higher fuel consumption may result in the vehicle running out of fuel before it reaches the next refueling station.

Thus, there is a need for a method of regenerating diesel engine particulate filters only above low fuel levels in order to obviate the problems mentioned above.

SUMMARY OF THE INVENTION

The present invention provides a method of regenerating a diesel particulate exhaust gas filter only when the supply of fuel for the diesel engine is above a predetermined value.

According to one aspect of the invention, a diesel exhaust filter regeneration method is provided, comprising the steps of sensing when the level of diesel fuel in a fuel tank of a vehicle is below a first threshold level representing a relatively low fuel level; regenerating the filter; and inhibiting the regeneration of the filter when the sensed fuel level is below the threshold value. The method further optionally includes sensing when the fuel level is below the first threshold, and a second, higher threshold level; sensing when the particulate loading of the filter is between a first relatively high load level, and a second load level higher than the first load level; and, regenerating the filter when the sensed fuel level is between the first and second threshold levels, and the sensed loading level of the filter is between the first and second load levels. The filter is regenerated by determining when the loading level of particulates in the filter exceed a predetermined loading level, and increasing the temperature of the exhaust gas to at least a pre-selected exhaust temperature above which the filter is regenerated through the oxidation of the particulates. The exhaust temperature is maintained above the pre-elected temperature for a predetermined length of time corresponding to a desired level of filter regeneration. The increase in exhaust gas temperature may be achieved by a number of techniques, including throttling the engine intake by reducing the oxygen content in the exhaust gases, by closing an ERG valve of the engine or by performing pilot injection of fuel into the engine's cylinders.

According to another aspect of the invention, a method of controlling the regeneration of a diesel particulates in the exhaust filter for a diesel fuel engine is provided, comprising the steps of inhibiting the regeneration of the filter when the level of fuel in a fuel tank of the vehicle is below a first threshold level and a second higher threshold level, and the particulate loading of the filter is between a first, relatively high load level and a second load level higher than the first load level in which regeneration of a filter would ordinarily be necessary.

Accordingly, it is the primary object of the present invention to provide a method of regenerating a diesel exhaust gas particulate filter which avoids a regeneration when the fuel supply to the engine is at a relatively low level.

Another object of the invention is to provide a method as described above which initiates a filter regeneration event only if the filter load is above a predetermined level.

Another object of the invention is to provide a method of the type mentioned above which reduces the possibility of a diesel engine powered vehicle running out of fuel as the result of increased fuel consumption at low fuel levels due to the initiation of a filter regeneration event.

A still further object of the invention is to provide a method of the type mentioned above which reduces driver dissatisfaction as a result of the effects of particulate filter regeneration during low fuel levels.

These, and further objects and advantages of the present invention will be made clear or will become apparent during the course of the following description of a preferred embodiment of the invention.

BRIEF DESCRIPTION OF THE DRAWINGS

In the drawings, which form an integral part of the specification, and are to be read in conjunction therewith, and in which like reference numerals are employed to designate identical components in the various views.

DESCRIPTION OF THE PREFERRED EMBODIMENT

Figure 1:
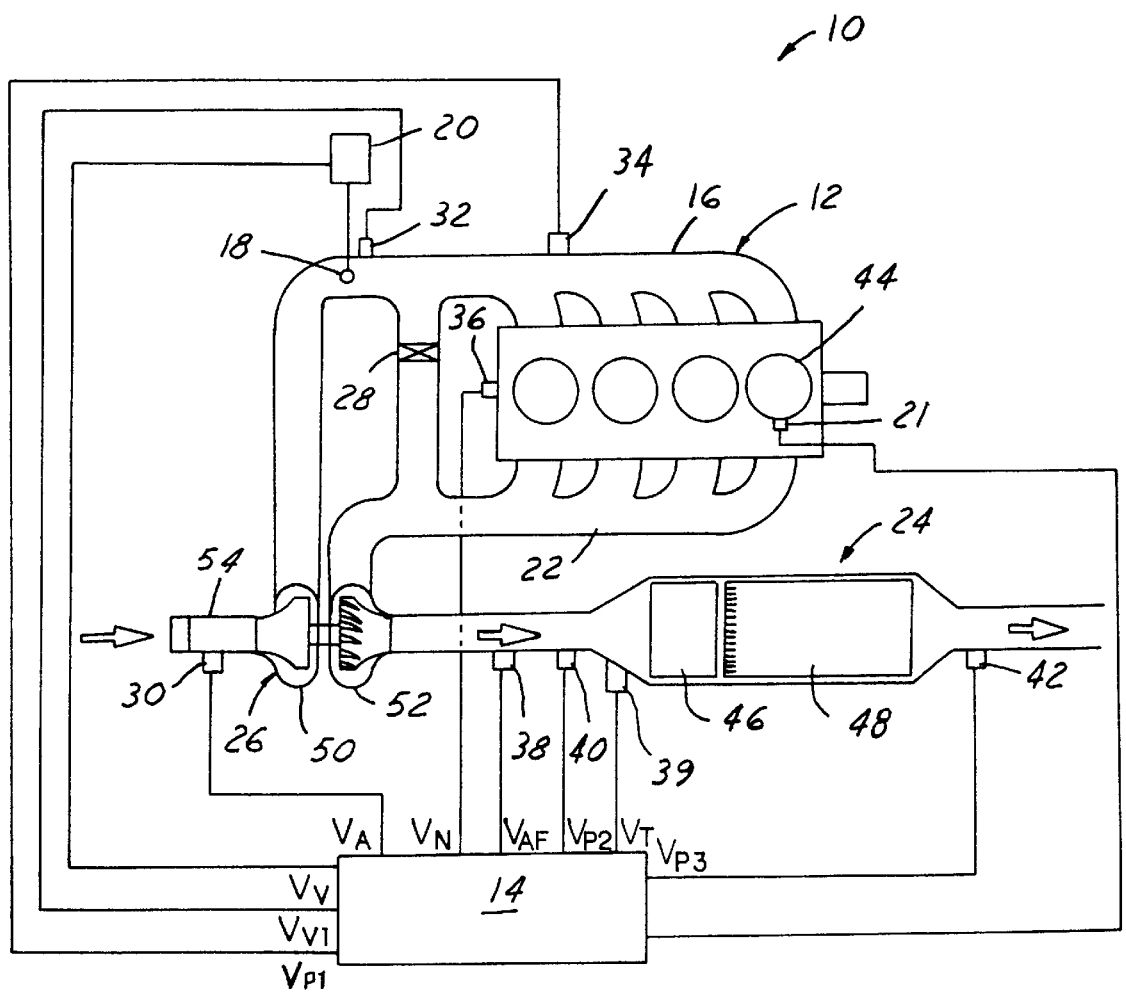
FIG. 1 is a combined block and diagrammatic view of an engine and related control system for carrying out the method forming the preferred embodiment of the present invention.

Referring first to FIG. 1, a vehicle generally indicated by the numeral 10 includes an internal combustion engine 12 and a microcontroller 14. As disclosed herein, the engine 12 is a diesel engine, and includes an intake manifold 16, and a throttle valve 18, a throttle valve actuator 20, a fuel injector 21, an exhaust manifold 22, a filter assembly 24, a turbocharger 26, an EGR valve 28, a mass air flow sensor 30, a throttle valve position sensor 32, a pressure sensor 34, a speed sensor 36, an air/fuel sensor 38, and a pressure sensors 40, 42.

The intake manifold 16 receives compressed air from the turbocharger 26 and directs the airflow to cylinders 44 of the engine 12. The configuration of the manifold 16 may vary based upon the number of cylinders 44. The manifold 16 includes the throttle valve 18 disposed therein.

The throttle valve 18 functions to selectively restrict the amount of air flowing through the manifold 16, to thereby control the operation of the engine 12, and in particular to control the exhaust gas temperature of the engine 12. When the valve 18 is throttled (e.g., moved from a full/open position to a partially closed position), the exhaust gas temperature increases. The position of the valve 18 may be controlled to increase the exhaust gas temperature above a predetermined temperature (e.g., above 450° C.), to regenerate the filter assembly 24. The method for controlling the valve 18 to increase the exhaust gas temperature will be discussed in more detail below. The valve 18 is conventional in the art and may comprise a conventional valve capable of restricting the airflow through the manifold 16. For example, the valve 18 may comprise a butterfly valve or the like.

A throttle valve actuator is provided to move the valve 18 to a specified position. The actuator 20 is conventional in the art and may comprise a pneumatically controlled actuator or a stepper motor actuator or the like. The actuator 20 may respond to electrical signals generated by the microcontroller 14 to adjust the position of the valve 18, thereby varying the flow of air to the manifold 16.

The fuel injector 21 provides fuel to one of the cylinders 44 and is conventional in the art. Although a single fuel injector 21 is illustrated for purposes of simplicity, it is understood that each of the cylinders 44 has a corresponding fuel injector 21. The fuel injector 21 receives fuel from a fuel pump (not shown) and injects a first pre-determined amount of fuel into one of the cylinders 44 during a power stroke of the corresponding cylinder 44. Further, the fuel injector 21 may be utilized to inject a second, pre-determined amount of fuel into one of the cylinders 44 late in the power stroke (i.e., post-injection of fuel) of the corresponding cylinder 44 to further control the exhaust gas temperature as described in further detail herein below. In particular, the microcontroller 14 may generate controls signals that cause the fuel injector 21 to inject the first and second pre-determined amounts of fuel, respectively, into one of the cylinders 44.

The exhaust manifold 22 directs exhaust gas from the cylinders 44 through the turbocharger 26 to the filter assembly 24. The configuration of manifold 22 may vary based on the number of cylinders 44 in the engine 12. The filter assembly 24 is provided to lower the exhaust gas emissions/particles before the exhaust gas is expelled from the engine 12. The assembly 24 may include an oxidation catalyst 46 and a particulate filter 48.

The oxidation catalyst 46 functions to increase the exhaust gas temperature of the engine 12 prior to the exhaust gas entering the particulate filter 48. In particular, the post/injection of fuel into one or more cylinders 44 results in unburned hydrocarbons being expelled from the cylinders 44 into the oxidation catalyst 46. The oxidation of hydrocarbons in the catalyst 46 is an exothermic reaction resulting in an additional increase in the exhaust gas temperature. Accordingly, the temperature of the exhaust gas exiting the oxidation catalyst is substantially higher (e.g., up to 200° C.) than the exhaust gas entering the filter assembly 24. Exhaust gas within the oxidation catalyst is preferably heated to at least 450° C. before being expelled into the filter 48, thereby regenerating the filter 48.

The particulate filter 48 is provided to capture particulate matter such as carbon particles in the exhaust gas. The filter 48 may be conventional in the art and may comprise a steel/wool filter, a ceramic/monolith filter, or a ceramic/coil filter or the like. As discussed above, the filter 48 must be regenerated/cleaned at certain intervals since the filter 48 may become clogged with carbon particles from the exhaust gas. Further, the filter 48 may be regenerated by throttling the valve 18 and/or post injecting fuel into the cylinders 44 to thereby increase the exhaust gas temperature above a pre-determined, incineration temperature (e.g., 450° C.) of the carbon particles.

The turbocharger 26 compresses the air inducted into the engine 12 and may include a compressor 50 connected to the intake manifold 16, and a turbine 52 disposed between the exhaust manifold and the filter assembly 24. The EGR valve 28 is provided to reduce NOx emissions from the engine 12. The valve 28 is conventional in the art and is disposed between the intake manifold 16 and the exhaust manifold 22.

The mass airflow sensor 38 generates a signal $V_A$ indicative of the mass airflow in the intake manifold 16. The microcontroller 14 may receive the signal $V_A$ and derive the measured value of mass airflow MAF from the signal $V_A$. The sensor 30 is conventional in design and is preferably disposed in an inlet 54 upstream of the intake manifold 16.

The throttle valve sensor generates a signal $V_V$ indicative of the position of the valve 18 and is conventional in design. The microcontroller 14 receives the signal $V_V$ and derives the measured position $THR_M$ of the valve 18 from the signal $V_V$. In one embodiment, the measured position $THR_M$ of the valve 18 may have a range of from 0 to 1 wherein the value 0 represents a full-open position (i.e., no throttling) of the valve 18, and the value 1 represents a full-closed position of the valve 18. It should be understood, however, that the position of the valve 18 may be represented in a number of alternate ways. For example, the position of the valve 18 van be represented by a percentage of the full-open or full-closed position, or by a rotation angle associated with the valve 18. The pressure sensor 34 generates a signal $V_{P1}$ indicative of the pressure within the intake manifold 16. The microcontroller receives the signal $V_{P1}$ and derives the measured value of the intake manifold pressure P from the signal $V_{P1}$. The pressure sensor 34 is conventional in design.

The speed sensor 36 generates a signal $V_N$ indicative of the speed of the crankshaft of the engine 12. As microcontroller receives a signal $V_N$ and derives the measured value of the engine speed N from the signal $V_N$. The speed sensor 36 is also conventional in the art.

The air-fuel ratio sensor 38 generates a signal $V_{AF}$ indicative of the air/fuel ratio of the engine 12. Microcontroller 14 receives the signal $V_{AF}$ and derives the measured value of the air/fuel ratio AF form the signal $V_{AF}$. The sensor 38 is conventional in design and is disposed between the turbine 52 and the filter assembly 24.

The temperature sensor 39 generates a signal $V_T$, indicative of the temperature at the outlet of the filter assembly 24. Microcontroller 14 receives the signal $V_T$ and derives the measured value of the exhaust gas temperature T of the exhaust gas entering the filter assembly 24 from the signal $V_T$. The pressure sensors 40, 42 generate signals $V_{P2}$, and $V_{P3}$ respectively, indicative of the pressure at the inlet and outlet, respectively of the filters 24. A microcontroller 14 receives signals $V_{P2}$, $V_{P3}$ and derives the measured values of the inlet and outlet pressures $P_I$, and $P_O$, from the signals $V_{P2}$, $V_{P3}$, respectively. Alternatively the pressure sensors 40, 42 may be replaced by a single differential pressure sensor (not shown) that generates a signal indicative of the pressure drop across the filter assembly 24. Microcontroller 14 may determine whether a regeneration of filter 48 is required based on the difference between the inlet and outlet pressures $P_I$, $P_O$.

Microcontroller 14 controls the engine 12, and in particular, controls the throttle valve 18. Microcontroller 14 is conventional in the art and is electrically connected to the throttle valve actuator 20, the fuel injector 21, the mass air flow sensor 30, the throttle valve position sensor 32, the pressure sensor 34, the speed sensor 36, the air/fuel ratio sensor 38, the temperature sensor 39, and the pressure sensors 40, 42. Microcontroller includes a read/only memory (ROM) (not shown) that stores a software program for implementing the method in accordance with the present invention.

Figure 2:
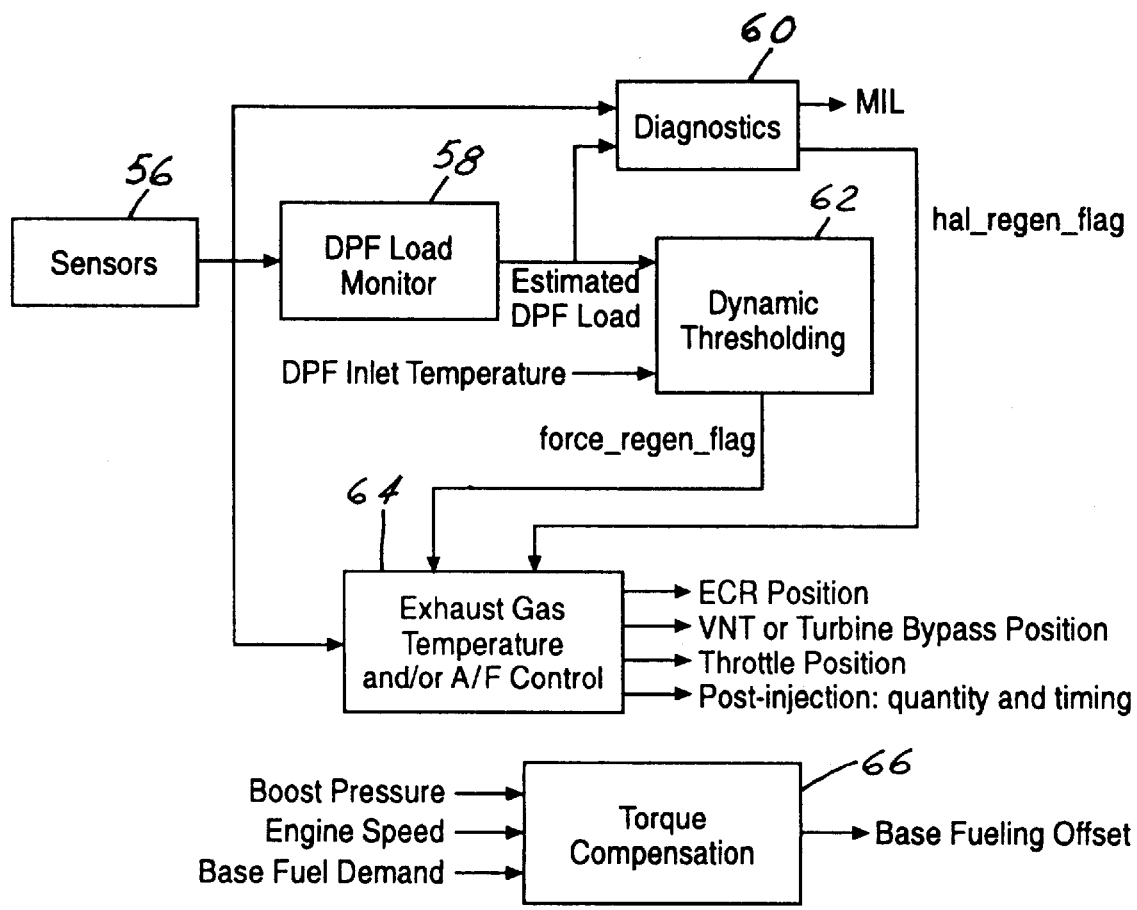
FIG. 2 is a block diagram of the control system shown in FIG. 1.

Attention is now directed to FIG. 2 which depicts the above described control system in block diagram form. A plurality of sensors 56 acquire information from the engine 12 and exhaust gas, and relays this information to a diesel particulate filter load monitor 58, which may comprise hardware or software forming part of the microcontroller 14. The sensors 56 include the previously discussed sensors 30, 32, 34, 36, 38, 39, 40 and 42. The DPF (diesel particulate filter) load monitor 58 records and stores the diesel particulate loading of the filter 48; this load value is essentially a particulate load recorded as a function of a pre-determined, maximum load level which corresponds to a pre-determined level of back pressure to the exhaust gas flowing through the filter assembly 24. The load monitor 58 may optionally include an adaptive algorithm to calculate the accumulated ash in the filter 48. It is desirable to record the amount of ash in the filter 48 because even though it does not contribute to increase exhaust backpressure, it comprises an inert material and thus does not contribute the exothermic reaction occurring during the regeneration process. The estimated DPF load is sent to both a diagnostics module 60, and a dynamic thresholding module 62, both of which preferably form software routines stored in the microcontroller 14. The diagnostics module 60 also receives information from the sensor 56, and issues a warning MIL when, for any reason, the DPF loading has exceeded a critical threshold that could cause the filter assembly 24 to melt if a regeneration event was initiated. The MIL warning may take the form of turning on a light in the driver's compartment of the vehicle. Similarly, the diagnostics module 60 may issue the same warning if the filter assembly 24 evidences signs of a catastrophic failure, as when the filter becomes clogged or begins to melt to the extent that effective filtration is no longer provided. Finally, the diagnostics module 60 sets a software flag which terminates an on-going regeneration event in the event that the filter 48 exceeds a certain critical temperature, above which the structural integrity of the filter assembly 24 is threatened.

The dynamic thresholding module 62 evaluates the DPF load as well as the temperature at the DPF inlet and makes a determination of when to initiate the regeneration event. When a decision is made to commence regeneration, a flag is set which is delivered to a control module 64 which functions to output a series of signals that control those components of the engine 12 required to raise the exhaust gas temperature to the threshold level necessary to produce DPF regeneration by combusting the accumulated particulates. The control module 64 is also responsive to a halt flag issued by the diagnostic module 60 which results in the termination of an on-going regeneration event. When the regeneration flag is set by the thresholding module 62, control module 64 issues signals to the appropriate control elements of the engine 12 to raise the exhaust temperature to the level necessary to initiate DPF regeneration. For example, first a signal is issued to close the EGR valve and a VNT (if present) or a turbine bypass is set to a fixed position or alternatively to an open position. A signal is then issued by module 64 to control the actuator 20 which operates the valve 18 to throttle the intake in order to initially raise the exhaust temperature to a level necessary to ensure that the oxidation catalyst has reached the so-called light-off temperature. Subsequently, post injection into the cylinders 44 is initiated in order to provide a further increase in the temperature the inlet of the filter assembly 24. In the event that a halt flag is issued by the diagnostics module 60, control module 64 opens the EGR valve 28 which in turn reduces the flow of oxygen to the filter assembly 24. When the engine's intake is severely throttled back (as much as 500 mbar), the engine's efficiency is decreased and it becomes necessary to compensate for the lack of torque. Therefore, the microcontroller 14 includes a torque compensation module 66 which comprises software that increases the amount of fuel supplied to the engine based on information derived from the sensors 56, including boost pressure, engine speed and base fuel demand. The data output by sensors 56 and modules 58, 60 and 62 are typically sampled at a relatively low rate, for example once per second, whereas module 64 and 66 are sampled at a relatively high rate, for example 16 ns.

From the foregoing description it may be appreciated that a control system is provided for determining the particulate loading of the filter 48 and increasing the exhaust gas temperature to achieve particulate light-off when desired. As previously stated, the initiation of a filter regeneration event when the vehicle's fuel tank is relatively low can result in several undesirable events, including unnecessary alarm to the vehicle's driver or an accelerated rate of fuel consumption which causes the vehicle to run out of fuel before the vehicle reaches a refueling station. In accordance with the present invention, however, the initiation of the filter regeneration event is coordinated with both the particulate loading level of the filter, and the level of fuel remaining in the vehicle's fuel tank.

Figure 3:
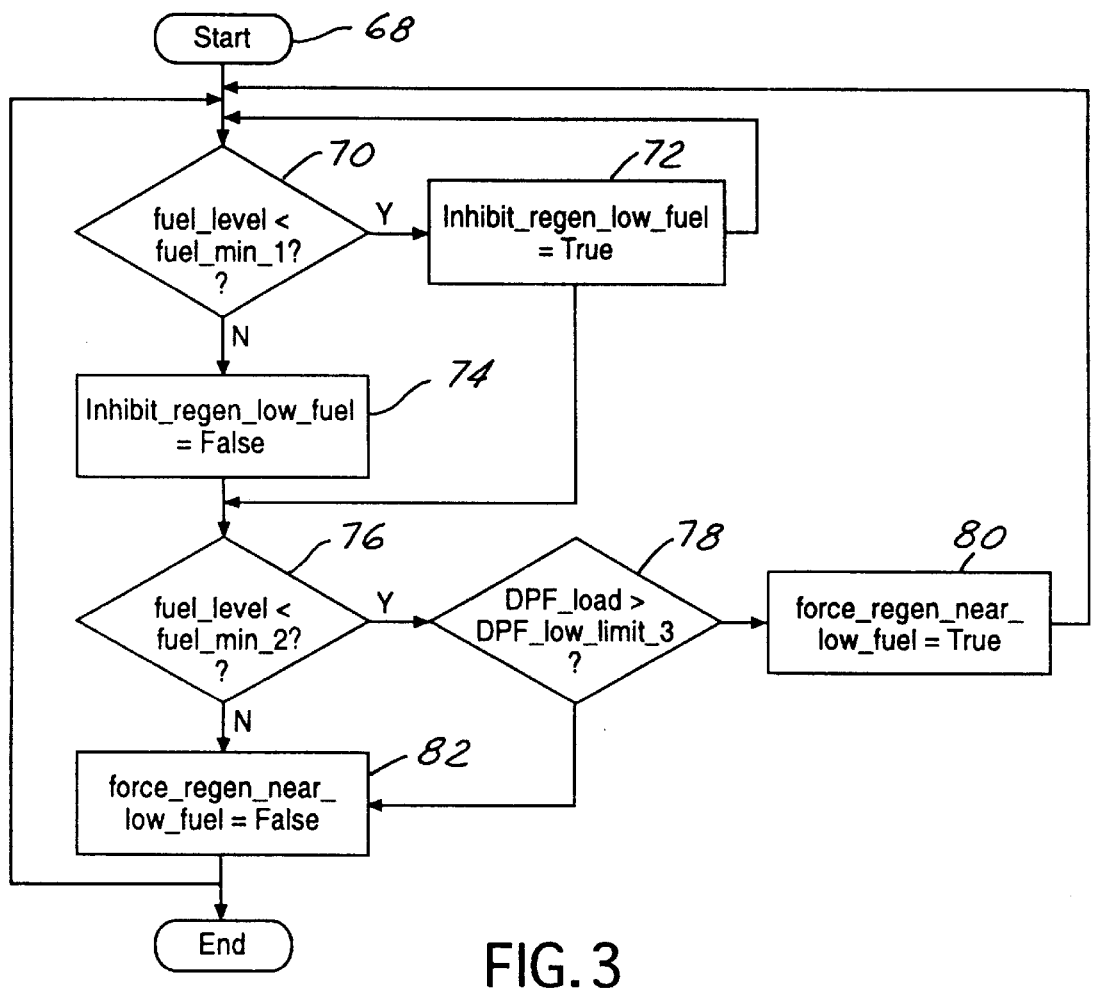
FIG. 3 is a flow chart showing the steps of the method of the present invention, which may be carried out using compute software instructions.

Referring now also to FIG. 3, he method of the present invention is preferably implemented by a software routine forming part of the microcontroller 14 (FIG. 1) which operates as follows. The routine starts at 68, and then initially determines whether the level of fuel in the vehicle's fuel tank is less than a first relatively low threshold value which may, for example correspond to the fuel level at which a "low fuel" lamp is illuminated in the vehicle's compartment. If the vehicle's fuel level sensor determines that the current fuel level is less than the first threshold value, then an inhibit regeneration flag is set, which in turn prevents a regeneration event from being initiated. More specifically, the inhibit regeneration flag generated at step 72 would prevent the control module 64 from initiating control events that increase the exhaust gas temperature.

If, however, the sensed fuel level is above the first threshold as determined at step 70, then the routine continues and a determination is made at step 76 of whether the sensed fuel level is less than a second threshold value which is greater than the first threshold value. If the answer is no, then the routine either ends at step 84 or, if engine operation is continued, the routine returns to step 70. If, however, the fuel level sensed at step 76 is less than the second threshold value, then a determination is made at step 78 on whether the loading of the particulate filter 48 is greater than a first particulate loading level which is chosen to be slightly below the level at which the filter 48 would definitely need to be regenerated. For example, the loading threshold limit could be 90% of the maximum particulate load limit. If the sensed, current particulate loading value is greater than the pre-selected, lower loading limit, then a forced regeneration flag is issued at step 80 which in turn initiates a regeneration of that. The logic represented by steps 76, 78, and 80 effectively causes a regeneration event to be initiated when the fuel level is at a relatively low level, but above the first threshold value, and the loading of the particulate filter 48 is near its maximum load value. As a result, circumstances are avoided in which a fully loaded particulate filter 48 occurs when the fuel tank is near empty. In the event that the sensed particulate loading level at step 78 is less than the predetermined loading limit, then no action needs to be taken and the logic sequence moves to step 82.

Based on the above description, it may be appreciated that the method of the present invention provides for regeneration of the filter 48 which comprises the steps of sensing when the level of fuel is below a first threshold level representing a relatively low fuel level; regenerating the filter by raising the exhaust gas temperature; and, inhibiting the regeneration process when the sensed fuel level is below the first threshold level. Furthermore, it can be appreciated that the method also includes sensing when the level of the fuel in the tank is between the first threshold level and a second, higher threshold level; sensing when the particulate loading is between a first relatively high load level, and a second load level higher than the first load level; and regenerating the filter when the sensed fuel level is between the fist and second threshold values, and the sensed filter loading is between the first and second load levels. Finally, it can be seen that the method of the present invention effectively inhibits the filter regeneration process when the sensed level of fuel in the vehicle's fuel tank is below a threshold level at which an alarm is normally issued to alert the driver of the low fuel level.

From the foregoing, it is apparent that the method described above not only provides for the reliable accomplishment of the objects of the invention, but does so in a particularly economical and efficient manner. It is recognized, of course, that those skilled in the art may make various modifications or additions to the preferred embodiment chosen to illustrate the invention without departing from the spirit and scope of present contribution to the art. Accordingly, it is to be understood that the protection sought and to be afforded hereby should be deemed to extend to the subject matter claimed and all equivalents thereof fairly within the scope of the invention.

What is claimed is:

1. A method of regenerating a diesel particulate exhaust filter for a diesel fuel engine powered vehicle, comprising the steps of:
(A) sensing when the level of diesel fuel in a fuel tank of said vehicle is below a first threshold level representing relatively low fuel level;
(B) regenerating said filter;
(C) inhibiting the performance of step (B) when the fuel level sensed in step (A) is below said first threshold level.

2. The method of claim 1, including the steps of:
(D) sensing when the level of diesel fuel in said fuel tank is between said first threshold level and a second threshold level higher than said first threshold level;
(E) sensing when the particulate loading of said filter is between a first, relatively high load level and a second load level higher than said first load level, wherein regeneration of said filter would ordinarily be necessary at said second load level; and,
(F) performing step (B) when the fuel level sensed in step (D) is between said first and second threshold levels, and the loading of said filter sensed in step (E) is between said first and second load levels.

3. The method of claim 1, including the steps of:
(D) sensing when the level of diesel fuel in said fuel tank is between said first threshold level and a second threshold level higher than said first threshold level;
(E) performing step (B) when the fuel level sensed in step (D) is between said first and second threshold levels.

4. The method of claim 1, including the step of notifying a driver of the vehicle that the fuel level sensed in step (A) is below said first threshold level.

5. The method of claim 4, wherein said notifying step is performed by activating a warning light visible to said driver.

6. The method of claim 1, wherein step (B) is performed by:
determining when the loading level of particulates in said filter exceeds a predetermined loading level,
increasing the temperature of the exhaust gases delivered to said filter to at least a preselected exhaust temperature above which said filter is regenerated by the oxidation of said particulates.

7. The method of claim 6, wherein said exhaust temperature is maintained above said preselected temperature for a preselected period of time corresponding to a desired level of regeneration of said filter.

8. The method of claim 6, wherein the step of increasing the temperature of said exhaust gases is performed by throttling the intake of said engine until an oxidation catalyst of said filter achieves light off.

9. The method of claim 6, wherein the step of increasing the temperature of said exhaust gases includes performing post injection of fuel to the combustion cylinders of said engine.

10. The method of claim 8, wherein throttling of said engine intake reduces the efficiency of said engine, and said method further includes supplying additional fuel to said engine to compensate for said efficiency reduction.

11. A method of controlling the regeneration of a diesel particulate exhaust filter for a diesel fuel engine, comprising the step of:
(A) inhibiting the regeneration of said filter when the level of diesel fuel in a fuel tank of said vehicle is below a first threshold level representing a relatively low fuel level.

12. The method of claim 11, including the step of:
(B) sensing when the level of diesel fuel in said fuel tank is below said first threshold level.

13. The method of claim 12, including the steps of:
(C) sensing when the level of diesel fuel in said fuel tank is between said first threshold level and a second threshold level higher than said first threshold level;
(D) sensing when the particulate loading of said filter is between a first, relatively high load level and a second load level higher than said first load level, wherein regeneration of said filter would ordinarily be necessary at said second load level; and,
(E) regenerating said filter when the fuel level sensed in step (B) is between said first and second threshold levels, and the loading of said filter sensed in step (D) is between said first and second load levels.

14. The method of claim 12, including the steps of:
(C) sensing when the level of diesel fuel in said fuel tank is between said first threshold level and a second threshold level higher than said first threshold level; and,
(D) regenerating said filter when the fuel level sensed in step (C) is between said first and second threshold levels.

15. The method of claim 11, including the step of actuating an annunciator to notify a driver of the vehicle that the fuel level sensed in step (B) is below said first threshold level.

16. The method of claim 11, including the step of regenerating said filter by:

determining when the loading level of particulates in said filter exceeds a predetermined loading level, increasing the temperature of the exhaust gases delivered to said filter to at least a preselected exhaust temperature above which said filter is regenerated by the oxidation of said particulates.

17. The method of claim 16, wherein said exhaust temperature is maintained above said preselected temperature for a preselected period of time corresponding to a desired level of regeneration of said filter.

18. The method of claim 17, wherein the step of increasing the temperature of said exhaust gases is performed by throttling the intake of said engine until an oxidation catalyst of said filter achieves light off.

19. The method of claim 18, wherein throttling of said engine intake reduces the efficiency of said engine, and said method further includes supplying additional fuel to said engine to compensate for said efficiency reduction.

* * * * *